(12) United States Patent
Kleiner et al.

(10) Patent No.: US 6,607,004 B2
(45) Date of Patent: Aug. 19, 2003

(54) FIRE PREVENTION SAFETY DEVICE FOR GAS METERS

(75) Inventors: Thomas Kleiner, Fislisbach (CH); Daniel Matter, Brugg (CH); Elias Juelke, Wettingen (CH); Beat Kramer, Windisch (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 10/180,068

(22) Filed: Jun. 27, 2002

(65) Prior Publication Data

US 2003/0010379 A1 Jan. 16, 2003

(30) Foreign Application Priority Data

Jul. 2, 2001 (EP) .............................. 01810641

(51) Int. Cl.[7] .............................................. F16K 17/38
(52) U.S. Cl. ........................................ 137/74; 137/75
(58) Field of Search ...................... 137/74, 75

(56) References Cited

U.S. PATENT DOCUMENTS 4,267,853 A * 5/1981 Yamaguchi et al. .......... 137/67
4,488,566 A * 12/1984 Hicks ........................... 137/74
4,938,053 A * 7/1990 Jepson et al. .................. 73/196
6,129,105 A    10/2000 Hec et al.

FOREIGN PATENT DOCUMENTS

EP          0305134 A1      3/1989
GB          2 209 200 A  *  5/1989

* cited by examiner

*Primary Examiner*—Gerald A. Michalsky
(74) *Attorney, Agent, or Firm*—Burns, Doane, Swecker & Mathis, L.L.P.

(57) ABSTRACT

A fire prevention safety device for a gas meter (3) has closure means (4, 4', V) that can be activated by heat to interrupt the gas supply into the gas meter (3) in the event of a fire. The gas meter (3) is arranged in a bypass (2) of a gas pipe (1). At least one of the aforementioned closure means (4, 4', V) for interrupting the gas supply is in each case arranged in the bypass (2) in the flow direction upstream and downstream of a sensor (31) belonging to the gas meter (3). The device permits a cost-efficient, simple and effective fire prevention safeguard, in particular for electronic gas meters.

10 Claims, 2 Drawing Sheets

FIRE PREVENTION SAFETY DEVICE FOR GAS METERS

This application claims priority under 35 U.S.C. §§119 and/or 365 to Appln. No. 01810641.9 filed in Europe on Jul. 2, 2001; the entire content of which is hereby incorporated by reference.

1. Field of the Invention

The invention relates to a fire prevention safety device for gas meters according to the preamble of patent claim 1. The fire prevention safety device is suitable in particular for gas meters in the domestic sector.

2. Background of the Invention

In the event of a fire, it is necessary to prevent the gas emerging from gas lines and increasing the risk of explosion. One known weak point is gas meters, which are arranged in the gas line itself or in a secondary line or a bypass thereto.

Instead of the known bellows gas meters use is increasingly being made of electronic gas meters. These electronic gas meters have sensors which are arranged in a protected manner in a housing. In order to satisfy the fire regulations, these housings and the electrical leadthroughs through the housing have to withstand high thermal stresses. This increases the material and production costs of such gas meters tremendously. However, since they are also to be used in the domestic and small commercial sector, minimization of costs is necessary.

Furthermore, U.S. Pat. No. 6,129,105 discloses an interrupter for a gas meter which is used in the event of a gas leak and/or in a prepayment system. The interrupter is arranged in a gas meter and adjoins a gas pipe. It has a spring-loaded valve with a diaphragm which interrupts the gas supply. Since this diaphragm melts in the event of a fire, it is arranged on a support element made of metal which, in the event of a fire, takes over the sealing function. The valve is spring-loaded and has a safety fuse, so that in the event of a fire it is pressed against the gas pipe by spring force and closes the pipe. This interrupter is relatively complicated and accordingly expensive.

SUMMARY OF THE INVENTION

It is therefore an object of the invention to provide a fire prevention safety device for gas meters which is simple and cost-efficient but effective.

This object is achieved by a fire prevention safety device having the features of patent claim 1.

In the fire prevention safety device according to invention, the gas meter is arranged in a bypass of a gas pipe, wherein at least one closure means, that can be activated by heat to interrupt the gas supply, is arranged in the bypass in the flow direction upstream and downstream of a sensor belonging to the gas meter.

As a result of arranging the closure means in the bypass, only a relatively small flow aperture has to be closed. In addition, it is not necessary for the gas meter itself to meet the high requirements on the ability to withstand a thermal load in the event of a fire, for example those placed by the HTB standard. It is sufficient if the bypass closed by the closure means according to invention meets the requirements. This fire protection safety device can be used in particular for gas pipe with electronic gas meters in the domestic and small commercial sector, since it is cost-efficient and can be installed with ease.

In a preferred embodiment, the closure means has a closure element of swelling or expandable material. In a preferred variant, the closure means consists completely of this swelling or expandable material.

In another preferred embodiment, the closure means has a spring-loaded valve piston for closing the bypass, the valve piston being held in its prestressed position by a securing element. The securing element is preferably a safety fuse or a bimetallic retainer.

Further advantageous variants of the method and advantageous embodiments emerge from the dependent patent claims.

BRIEF DESCRIPTION OF THE DRAWINGS

In the following text, the subject of the invention will be explained using preferred exemplary embodiments, which are illustrated in the appended drawings, in which:

FIG. 2a shows an enlarged detail according to FIG. 1a;

DETAILED DESCRIPTION OF THE INVENTION

Figure 1A:
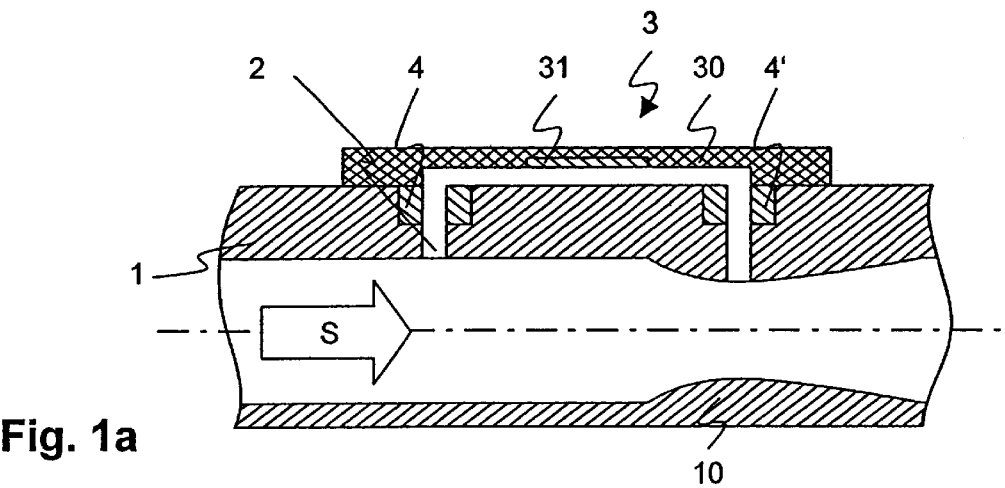
FIG. 1a shows a schematic representation of a gas pipe section with a gas meter during normal operation.

FIG. 1a shows, in schematic form, a section of a gas pipeline 1, such as is present at a consumer, for example in a house. A flow direction for the gas is represented in the figure by an arrow S.

From the gas pipeline 1 there branches off a bypass 2, which leads through a gas meter 3, in particular an electronic gas meter. The gas meter 3 is shown purely schematically here. It substantially comprises a housing 30 and a sensor 31 which is arranged in the housing 30 and has heating elements and temperature sensing elements. The electric leadthroughs to the outside and also a control and evaluation electronics unit are not illustrated. The bypass 2 is preferably arranged in such a way that it is located over a narrowing 10 in the gas pipeline 1.

At least one closure means 4, 4' for interrupting the gas supply is arranged in the bypass 2 in the flow direction S upstream and downstream of the sensor 31 belonging to the gas meter 3. The closure means 4, 4' is arranged in a pipe wall of the gas pipeline 1 or in a pipe wall of a possibly present bypass pipe.

Figure 1B:
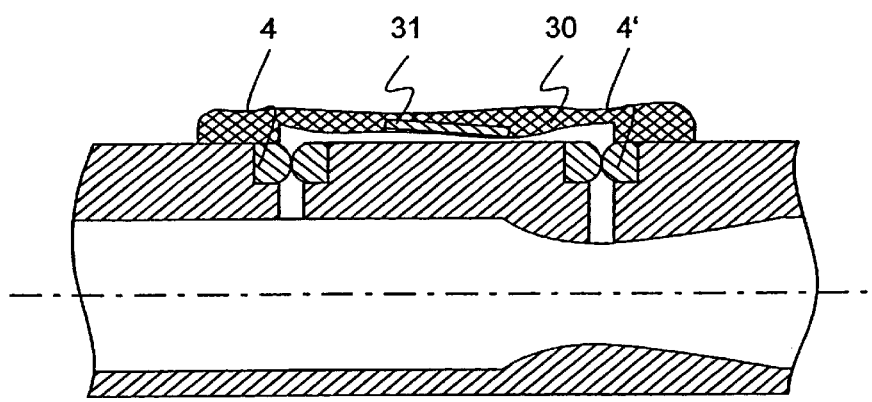
FIG. 1b shows the gas pipe section according to FIG. 1a at elevated ambient temperature.
Figure 2A:
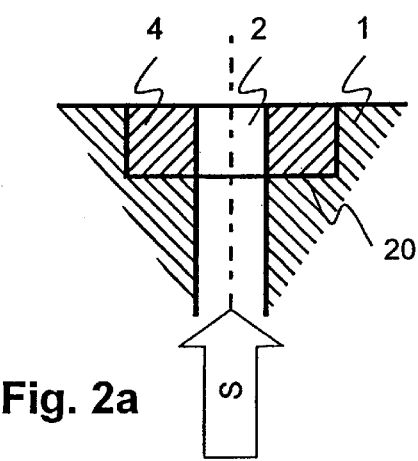
Figure 2B:
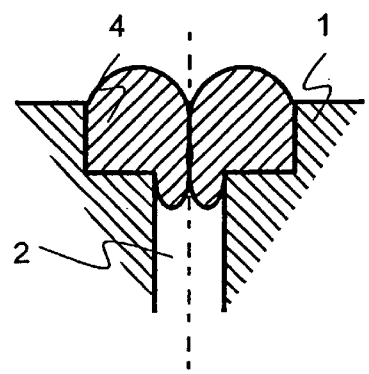
FIG. 2b shows an enlarged detail according to FIG. 1b.

In a first exemplary embodiment, the closure means 4, 4' has a closure element made of a swelling or expandable material. In the variant illustrated in FIGS. 1a, 1b and 2a, 2b, the closure element forms the closure means 4, 4'. It is preferably annular and arranged in a peripheral groove 20 present in the bypass. During normal operation according to FIGS. 1a and 2a, the expandable material permits the gas to flow through the bypass 2. At an elevated ambient temperature, in particular in the event of a fire, however, the closure element expands and closes the bypass irreversibly, as illustrated in FIGS. 1b and 2b. In this case, it is unimportant whether the housing 30 of the gas meter 3 has melted.

The temperature at which the expandable metal forms a closure depends on the material selection. The material is preferably intended to expand at a temperature of approximate 150° and to achieve an expansion pressure of up to 10 bar. Suitable swelling or expandable material is, for example, Insulex®, which is known for sealing joints and cavities in windows, or Crystic Fire Guard®, which is a combination of polyester resin, hardener and a filler.

Figure 3A:
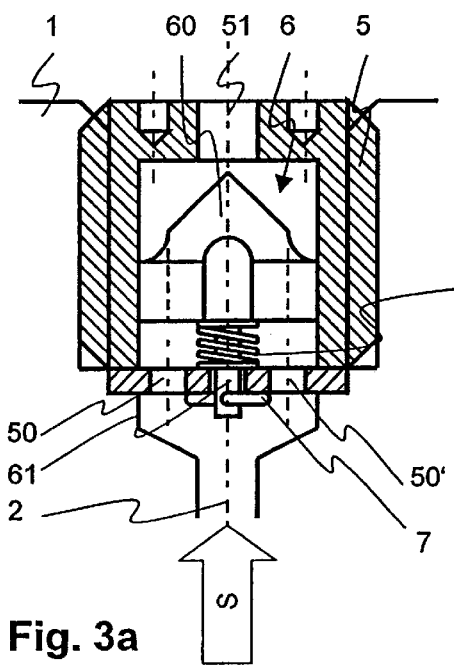
FIG. 3a shows a closure means in a second embodiment during normal operation.
Figure 3B:
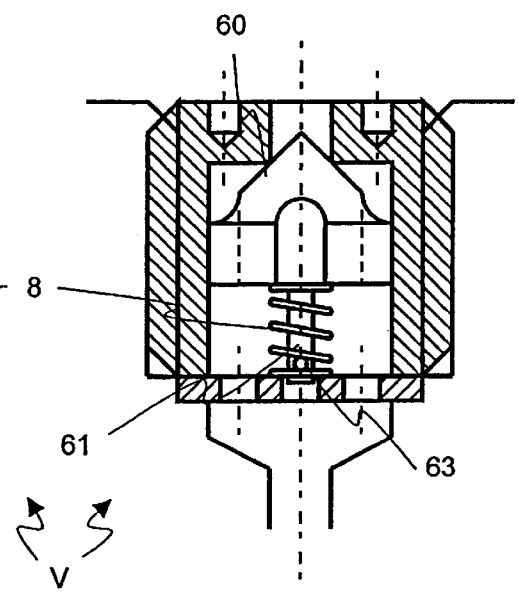
FIG. 3b shows a closure means according to FIG. 3a at elevated ambient temperature.

In a second preferred embodiment, the closure means is formed by a mechanical valve V, as shown in FIGS. 3a and 3b. At least one valve V in each case is again arranged in the bypass 2 and in the flow direction upstream and downstream of the sensor 31 in a pipe wall 10 of the gas pipe 1. The valve V has a valve housing 5 which has at least one, here two inlet openings 50, 50', and at least one, here exactly one, outlet opening 51. Furthermore, the valve V has a valve piston 6 loaded by a spring 8. A valve head 60 of the valve piston 6 is arranged in the valve housing 5. It has at least one through opening 62 in order to permit a gas flow through the valve in the normal case illustrated in FIG. 3a. A piston rod 61 connected to the valve head 60 projects out of the valve housing 5. At a first end, the spring 8 bears on an underside of the piston head 60 and, at a second end, bears on an inner side of the valve housing 5 and surrounds the piston rod 61. The valve piston 6 is held in its spring-loaded position by means of a securing element, the securing element engaging in a recess 63 in the piston rod 61. In the exemplary embodiments described here, the securing element is a bolt-like safety fuse 7. Suitable materials for the safety fuse or fusible element are, in particular, materials which have a melting point between 70° C. and 120° C. Typical materials are Wood's alloy, Lipowitz alloy and other alloys from the group comprising bismuth, lead, cadmium and tin. At elevated ambient temperature, the safety fuse 7 melts and releases the piston rod 61. The valve head 60 is pressed into the outlet opening 51 by the spring 8 and closes said opening. This situation is illustrated in FIG. 3b. The closure of the bypass is also irreversible here.

Figure 4A:
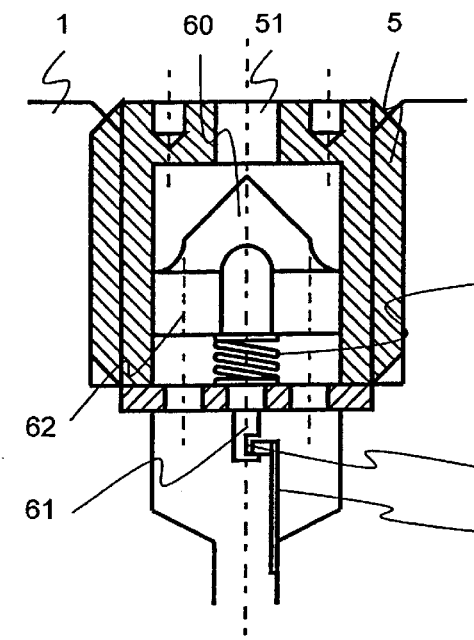
FIG. 4a shows a closure means in a third embodiment during normal operation.
Figure 4B:
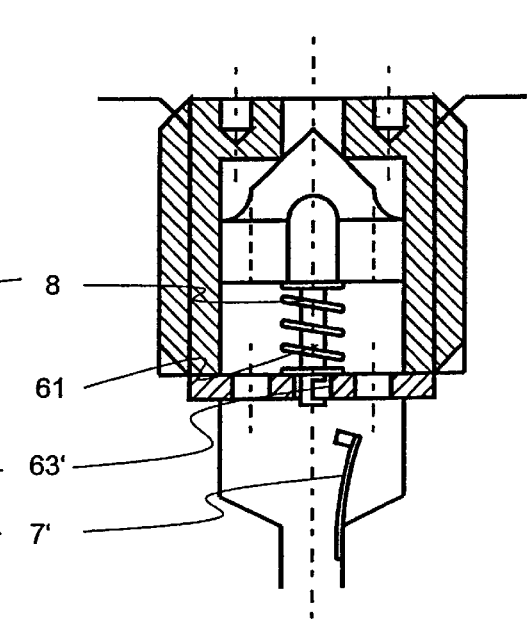
FIG. 4b shows a closure means according to FIG. 4a at elevated ambient temperature.

In a third preferred embodiment according to FIGS. 4a and 4b, use is likewise made of the valve V described above. Instead of the safety fuse 7, however, there is a bimetallic frame- or stirrup-shaped retainer 7' which engages in a recess 63' in the piston rod 61, as shown in FIG. 4a. At an elevated temperature, the bimetallic retainer 7' bends and releases the piston rod 61, so that the bypass is closed irreversibly, as shown by FIG. 4b.

In a further preferred embodiment, which is not illustrated in the figures, at least two closure means are arranged one after another in series. In this case, preferably, a closure element comprising an expandable material according to FIGS. 2a, 2b and a valve V according to FIGS. 3a, 3b or 4a, 4b are arranged in series.

The device according to invention permits a cost-efficient, simple and effective fire prevention safeguard, in particular for electronic gas meters.

List of Designations

| [0030] | S | Flow direction |
| [0031] | V | Valve |
| [0032] | 1 | Gas pipeline |
| [0033] | 10 | Narrowing |
| [0034] | 2 | Bypass |
| [0035] | 20 | Groove |
| [0036] | 3 | Gas meter |
| [0037] | 30 | Housing |
| [0038] | 31 | Sensor |
| [0039] | 4 | First closure element |
| [0040] | 4' | Second closure element |
| [0041] | 5 | Valve housing |
| [0042] | 50 | First inlet opening |
| [0043] | 50' | Second inlet opening |
| [0044] | 51 | Outlet opening |
| [0045] | 6 | Valve piston |
| [0046] | 60 | Piston head |
| [0047] | 61 | Piston rod |
| [0048] | 62 | Through opening |
| [0049] | 63 | Recess |
| [0050] | 63' | Recess |
| [0051] | 7 | Safety fuse, fusing element |
| [0052] | 7' | Securing element |
| [0053] | 8 | Spring |

What is claimed is:

1. A fire prevention safety device for a gas meter, the safety device having closure means that can be activated by heat to interrupt the gas supply into the gas meter in the event of a fire, wherein the gas meter is arranged in a bypass of a gas pipe and
at least one of the aforementioned closure means for interrupting the gas supply is in each case arranged in the bypass in the flow direction upstream and downstream of a sensor belonging to the gas meter.

2. The device as claimed in claim 1, wherein the closure means is arranged in a pipe wall of the gas pipe.

3. The device as claimed in claim 1, wherein the at least one closure means has a closure element made of expandable material, which expands under the action of heat and closes the bypass.

4. The device as claimed in claim 3, wherein the closure means is annular and is arranged in a peripheral groove present in the bypass.

5. The device as claimed in claim 3, wherein a closure means and a closure means are arranged one after another in series.

6. The device as claimed in claim 1, wherein the at least one closure means has a spring-loaded valve piston for closing the bypass in the event of a fire.

7. The device as claimed in claim 6, wherein the closure means has a securing element which holds the valve piston in its spring-loaded position, the securing element being a safety fuse.

8. The device as claimed in claim 7, wherein the closure means has a valve housing with at least one inlet opening and at least one outlet opening, wherein the valve piston passes through the valve housing, a piston head of the valve piston being arranged in the valve housing, and a piston rod connected to the piston head projecting out of the valve housing, and wherein the securing element is operatively connected to the piston rod.

9. The device as claimed in claim 8, wherein the securing element engages in a recess in the piston rod.

10. The device as claimed in claim 6, wherein the closure means has a securing element which holds the valve piston in its spring-loaded position, the securing element being a bimetallic retainer.

* * * * *